Nov. 22, 1966  P. J. YAVORSKY  3,287,143
GAS-TIGHT REFRACTORY ARTICLE AND METHOD OF MAKING SAME
Filed Aug. 30, 1961

INVENTOR.
PAUL J. YAVORSKY
BY
Meyer, Baldwin, Doran & Egan
ATTORNEYS

United States Patent Office 3,287,143
Patented Nov. 22, 1966

1

3,287,143
GAS-TIGHT REFRACTORY ARTICLE AND
METHOD OF MAKING SAME
Paul J. Yavorsky, Bedford, Ohio, assignor to Zirconium Corporation of America, Solon, Ohio, a corporation of Ohio
Filed Aug. 30, 1961, Ser. No. 135,046
10 Claims. (Cl. 106—55)

The present invention is related to a gas-tight, dielectric refractory article made of an oxide of a light metal element such as an element of Group IVb of the Periodic Arrangement of the Elements. The invention is also related to an aqueous slurry adapted to prepare the above improved article and to a method of making the improved article by forming the slurry into a green casting of a desired shape and then firing the green casting to produce the strong refractory article.

More particularly, the invention is directed to a strong, gas-tight, chemically inert, refractory zirconium oxide article and the method of making the same.

It is an object of the present invention to provide a strong, gas-tight, refractory article of an oxide of a light metal element such as zirconium.

It is an object of the present invention to provide an aqueous ceramic slurry adapted for making a fired gas-tight article of a refractory material such as an oxide of an element of Group IVb of the Periodic Arrangement of the Elements.

An object of the present invention is the making of a strong, gas-tight, and dielectric article of a refractory material such as an oxide of an element belonging to Group IVb of the Periodic Arrangement of the Elements.

It is an object of the present invention to provide a strong, gas-tight, refractory article of zirconium oxide that can be used as a probe through a water boiler shell without undergoing corrosion or deterioration even though the boiler water is under a pressure of the order of 2000 p.s.i. and has a temperature of 650° F. or more.

It is an object of the present invention to provide a chemically inert, dielectric, gas-tight article of a refractory material such as zirconium oxide, hafnium oxide, titanium oxide, and thorium oxide, and a method of making the same.

Other objects will be apparent from the specification that follows, the appended claims, and the drawings in which:

The present invention provides a gas-tight ceramic article that can withstand even the severe corrosive conditions encountered when used as a probe through the shell of a water boiler where the water is over 650° F. and under a pressure of more than 2000 p.s.i. The gas-tight ceramic article is also an electrical insulator and has many uses in electronic, metallurgical, glass and missile industries.

While the drawings illustrate an article made by slip-casting, the improved gas tight article of the present invention may also be made by other methods such as extruding and pressing.

Figure 1:
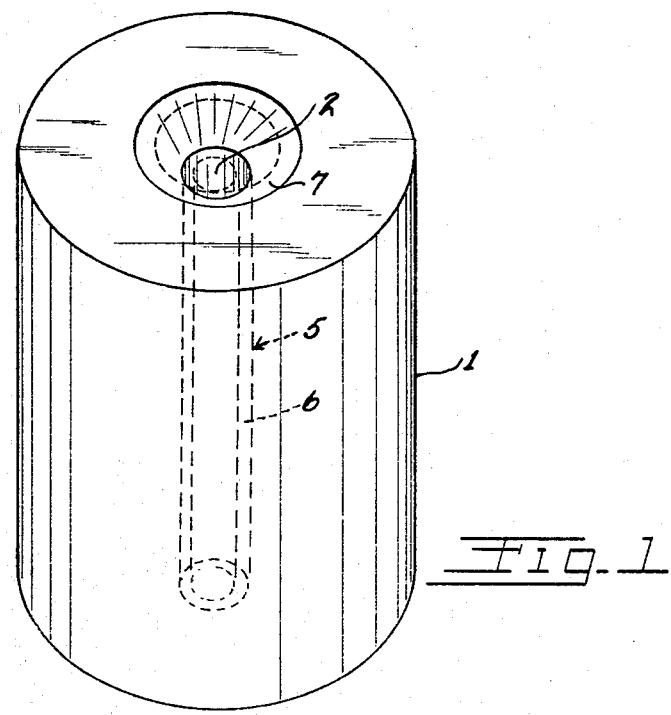
FIG. 1 is a perspective view of a green casting as shown in dotted lines in the form of a hollow tube which is formed inside a porous, water absorbent plaster of Paris mold.

Turning to the drawings, FIG. 1 shows a porous plaster of Paris mold 1 having an opening 2 into which the improved aqueous ceramic slurry of this invention is poured to form a green casting 5 comprising a hollow tube 6 and an upper funnel-shaped lip 7. According to the present invention, the water used to suspend the ceramic particles in the slurry is absorbed by the porous mold, which is preferably plaster of Paris, to form the green casting and the excess slurry is poured out.

Figure 2:
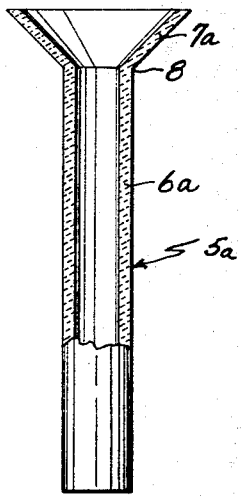
FIG. 2 is an elevational view, partly in section, of a fired gas-tight article made of a refractory material such as zirconium oxide, the article being produced by the firing of the green casting illustrated in FIG. 1.
Figure 3:
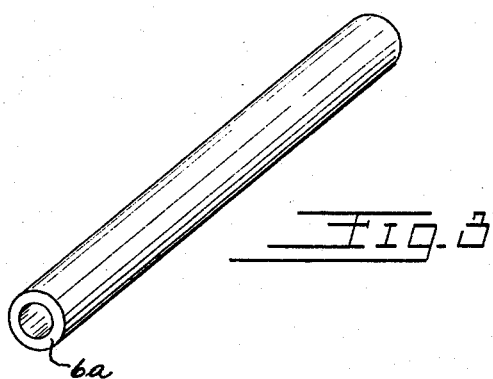
FIG. 3 is a perspective view of a fired tube made from fired article shown in FIG. 2 by cutting off the funnel-shaped end.

After a few minutes, the green casting 5 is removed, supported in a furnace by its lip portion 7 and fired at a temperature of about 2500° to 3600° F. in an oxidizing atmosphere to provide a strong fired article 5a shown in FIG. 2. The article 5a comprises a strong hollow tube 6a and a funnel-shaped lip portion 7a which, after firing may be cut off at its juncture 8 with the tube 6a to provide the final hollow thin-walled tube 6a shown in FIG. 3, the tube being gas-tight and chemically inert. In a similar manner, other hollow thin-walled articles such as test tubes may be made.

Thus, the improved gas-tight article of the present invention is formed from an aqueous slurry having a pH of about 7 to 9 and a specific gravity of about 1.1 to 3 and comprising (1) about 100 parts by weight of a relatively fine refractory material having a grain size of about 1 to 90 percent less than 1 micron and 10 to 99 percent less than 40 microns and greater than 1 micron, said refractory material comprising an oxide of an element of Group IVb of the Periodic Arrangement of the Elements and having an atomic weight of about 47 to 233, (2) about 0.01 to 3 parts by weight of a low temperature binding and calcium ion-reactive agent, (3) about 0.01 to 0.35 part by weight of an alkaline buffer, (4) about 0.05 to 2 parts by weight of a non-foaming non-reactive germicide agent, and (5) about 20 to 200 parts by weight of water.

As previously indicated, the present invention also includes the aqueous slurry used to make the improved gas-tight article and the method of making the same in which the above described slurry is formed into a green casting of a desired shape, the excess suspending water is removed from the refractory particles by absorption into the porous mold, and the green casting is fired to form a strong gas-tight ceramic article of the desired shape.

The best refractory material presently known to me for use in the present invention is zirconium oxide. The zirconium oxide is preferably relatively pure calcined zirconia that has been preheated at 1700° F. to 3000° F.; or mixtures thereof with stabilized cubic zirconia, which material has been stabilized by heating relatively pure cubic $ZrO_2$ with about 1.5 to 60% by weight of CaO or MgO at 1700° to 3000° F. for ¼ to 2 hours. Other suitable refractory materials preferably contain at least some $ZrO_2$ although oxides of other Group IVb elements of the Periodic Arrangement of the Elements such as Ti, Hf, and Th can be used.

Also it has been found that the most consistent results have been obtained by using the above refractory material in a relatively fine particle size and one which is controlled within certain limits, namely, a grain size such that about 1 to 90% by weight of the particles are less than 1 micron in diameter and about 10 to 99% of the particles are greater than 1 micron in diameter but less than 40 microns. Surprisingly, when the particle size of the refractory particles is finer or coarser than the above described limits, the castings are too porous or crack easily under thermal strain and are unsatisfactory for commercial use. Preferably the average grain size is from about 10 to 80 percent by weight less than 1 micron and 20 to 90 percent greater than 1 micron and less than 40 microns.

Per 100 parts by weight of the refractory material, generally about 0.01 to 3 parts by weight of a low temperature binder that is reactive with calcium-ions may be used. However, the preferred range of the low temperature binder is about 0.05 to 0.5 part by weight for the best gas-tight and chemically inert structure.

The preferred low temperature binder is an alginate such as sodium alginate, potassium alginate, ammonium alginate or even propylene glycol alginate, which binding agent also acts as a dispersing agent, a suspension agent, and an ion exchange material. Apparently, the alkali metal or ammonium ion of the alginate enters into an exchange reaction with the calcium ion of the calcium sulfate (plaster of Paris) mold to build up a surface layer of calcium alginate next to the mold walls and thus deposit thereon a desired shape.

The above preferred salts of alginic acid, are water-soluble derivatives of alginic acid, a natural gum product extracted from the giant kelp that grows in the coastal waters of southern California. Alginicacid is a hydrophilic colloidal polymer of anhydro-beta-D-mannuronic acid units, the structural formula of which is generally accepted as:

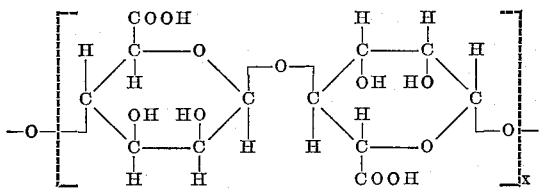

Generally the preferred alkali metal derivatives of alginic acid have a molecular weight of about 2000 to 10,000, consisting of nearly one hundred to as high as several hundred of the above structural units.

Commercially available alkali metal salts or other suitable derivatives of alginic acid are alginates sold by the Kelco Company, New York, N.Y. under the trademarks, Kelcoloid (propylene glycol esters of alginic acid), Kelgin (sodium alginate), Keltex (sodium alginate) and Superloid (ammonium alginate).

It is also possible to use a low temperature binder material such as Burtonite, a water soluble colloid sold by the Burtonite Company, Nutley, N.J., in grades such as "V-7-E," "#7," "#77," and "#78." In Burtonite, the colloids are chemically highly polymerized saccharide complexes of mannose and glactose. With the above colloid, small amounts of borated water will cause a borogum gel to form and the green casting walls can be built up by saturating the mold or otherwise introducing borated water at the inner mold surfaces. Generally, however, this method of suspending the refractory particles and forming green castings is much more difficult than by using alginates, also supplied by the Burtonite Company as X90, a sodium alginate.

As previously indicated, the other ingredients necessary to complete the improved slurry are water as the suspending medium, an alkaline salt such as sodium carbonate as a buffering agent to adjust pH to a range of about 7 to 9, and a non-foaming germicide such as formaldehyde which is not reactive with the other slurry ingredients.

While the exact amounts of water buffer and germicide are not as important as the amount of low temperature binder and suspending agent per 100 parts by weight of the refractory oxide; nevertheless, generally about 20 to 200 parts by weight of water, about 0.01 to 0.35 part by weight of the alkaline buffer and about 0.05 to 2 parts by weight of the germicides should be used.

The preferred ranges of the above for the most consistent all-around results, particularly when slip-casting, are about 15 to 60 parts by weight of water, about 0.05 to 1 part by weight of buffer and about 0.5 to 1.5 parts by weight of the germicide agent per 100 parts by weight of the refractory oxide material.

It is preferred that the water used as the suspending medium be distilled or de-ionized since impurities in the water such as iron, cobalt and magnesium will react with the alginates and thus interfere with the three-fold function of the alginate binding material, namely its action as a dispersing agent, a suspending agent, and a calcium-ion exchange agent.

The following examples are intended to illustrate the present invention, and not to limit it in any way;

EXAMPLE I

Aqueous slurries designated A and B were prepared from the following formulations:

| Ingredients | Parts by Weight | |
|---|---|---|
| | A | B |
| Zirconium oxide, finely divided (60% greater than 1 micron and less than 40 microns, 40% less than 1 micron) and calcined at 2,250° F. | 50 | 50 |
| 90% ZrO$_2$+10% CaO, finely divided (50% greater than 1 micron and less than 40 microns, 50% less than 1 micron) and calcined at 2,950° F. | 50 | 50 |
| Formaldehyde | 1 | 1 |
| Sodium alginate | 0.1 | 0.05 |
| Sodium carbonate | 0.05 | 0.1 |
| Distilled water | 40 | 50 |
| Bentonite | None | 0.5 |

The above ingredients listed under Formulation A were thoroughly mixed in a ball mill to provide a homogeneous, stable slurry having a viscosity of 600 centipoises at 25° C., a specific gravity of 2.0 and pH of 7.2. In a similar maner, the ingredients of Formulation B were ball-milled to yield a slurry of excellent suspension, long storage life and low viscosity, the viscosity being about 1000 centiposes at 25° C. (Brookfield) the specific gravity 2.1 and the pH 7.4.

The Formulations A and B were each slip cast in a conventional manner into a plaster of Paris mold such as illustrated in FIG. 1 to form a green unfired thin-walled tube, in this case having an O.D. of ⅜ inch and a wall approximately 1/16 inch thick, with a funnel on one end such as seen in FIG. 1. Each of the tubes were suspended in a furnace by its funnel and fired at 2900° F. in an oxidizing atmosphere for 30 minutes to provide a fired article as shown in FIG. 2.

After cooling, each of the funnels was cut off of the end of the tube to provide excellent gas-tight zirconia tubes having a dense polycrystalline structure with the ZrO$_2$ present as a monophase. Both the tube made of Formulation A and the tube made of Formulation B were used as probes through a water shell at a temperature of 650° F. and a pressure of 2000 p.s.i. in order to get data such as the pH of the boiler water. The tubes were not attacked and did not leak moisture or gas even after continuous service for three months.

An aluminum oxide probe, which material is often commercially employed as a boiler probe, was used as a control along with zirconia tubes. In contrast to the condition of the gas-tight zirconia tubes of this invention, the alumina probe was badly corroded and pieces of the probe were flaked away, the action of the water being very corrosive at the above described temperature and pressure.

EXAMPLE II

An aqueous slurry was prepared from the following formula:

| Ingredients: | Parts by weight |
|---|---|
| $ZrO_2$, calcined at 1750° F. and having a fineness of 90% >1 micron and <40 micons and 10% <1 micon | 30 |
| $ZrO_2$+5% CaO, calcined at 2950° F. and a fineness the same as the $ZrO_2$ particles above | 70 |
| Formaldehyde | 0.5 |
| Sodium alginate | 0.05 |
| Sodium carbonate | 0.05 |
| Distilled water | 35 |

A green thin walled tube having a length of 5 inches, an outside diameter of ½ inch and a wall thickness of 1/16 inch was made by slip casting the above slurry in a conventional plaster of Paris mold. When the proper thickness of tube wall was obtained, the excess slurry was poured off the mold. Upon drying, the green tube was removed from the mold and the tube fired at 3100° F. for 20 minutes in an oxidizing atmosphere.

The resultant tube was strong, impervious to moisture and electrical penetration, and gas-tight. The tube was found to be useful in many pyrochemical and electrochemical applications where the above outstanding combination of properties, as well as its properties of high heat resistance and chemical inertness are important.

The amount of gas permeation was found to be substantially nil. For instance, a vacuum was pulled on the inside of one of the tubes so that the absolute pressure therein was only $10^{-5}$ mm. of mercury. This low pressure held constant for several days with no leakage through the tube walls. Also, the tubes exhibited excellent resistance to permeability at 2500° F. holding $10^{-5}$ mm. Hg vacuum.

Likewise, the electrical penetration was found to be very slight and the insulation value very good, there being less than 1 milliampere leakage per 1000 volts applied in a thickness of 1/16 inch.

In the above examples, other finely divided refractory zirconium oxide particles (as hereinafter described in greater detail) can be substituted for all or part of the calcined zirconia and calcined zirconia-calcium oxide material used to provide equivalent results. Thus, the refractory zirconia material may be zirconia alone or in combination with about 1.5 to 60 percent of its weight of alkali metal or alkaline earth oxides. The refractory mineral content can also be zirconia particles physically mixed or pre-reacted with stabilizing oxides such as $Y_2O_3$, $La_2O_3$, $Sc_2O_3$, $Dy_2O_3$, $CeO_2$, $PrO_2$ and $TiO_2$ or compounds of the above elements that form their oxides upon subsequent firing. In any event, it is preferred that the above stabilizing oxides be about 1 to 10 percent by weight of the $ZrO_2$ particles. While the alkaline earth oxides such as CaO and MgO should be first pre-heated with the $ZrO_2$ in accordance with the teachings of United States Patent No. 2,937,102 to Harold C. Wagner, the above mentioned stabilizing oxides do not have to be pre-heated or pre-reacted since they produce no dissociable ions to react adversely with the alginate gel portion of the slurry.

Also generally about 1.5 to 60 percent by weight, but preferably less than 50% by weight, of the zirconia or mineral content of the slurry can be physically mixed or pre-reacted with metals such as V, Cr, Mn, Fe, Co, Ni and Cu having an atomic number from about 23 to 29 to provide good results in accordance with the present invention. Also compounds of the above metals such as their chlorides can be used which yield the metal when fired in a reducing atmosphere such as hydrogen and ammonia.

While zirconia is the highly preferred refractory mineral basic ingredient of the novel slurry and resultant improved fired articles of the present invention, all or part, but generally about 1.5 to 60 percent by weight of the zirconia can be substituted by other refractory mineral oxides such as $ThO_2$, BeO, $HfO_2$, $TiO_2$, $AlO_3$, $Y_2O_3$, $CeO_2$ and $Dy_2O_3$ to provide refractory, chemically inert and gas-tight articles. However, when the other oxides are used, the best results are obtained when less than 30 percent by weight of the zirconia is replaced thereby. Of the above oxides, the oxides of other elements belonging to Group IVb of the Periodic Arrangement of the Elements, namely, titanium, hafnium and thorium, having atomic weights of about 47 to 233 provide by far the best results, and for some applications may constitute substantially all the refractory mineral content of the resultant article. Of the balance of the above oxides, $CeO_2$ is the next best refractory material, Ce sometimes being listed as a Group IVa element. Not as good as $CeO_2$, but nevertheless useful for some limited applications is $Y_2O_3$, an oxide of a Group IIIa element, and following that, $DyO_3$ is the next preferred oxide.

Also, as previously indicated, the zirconia used in Examples I and II can be substituted in amounts of about 1.5 to 60% by weight thereof by unreacted non-dissociating alkaline earth fluorides such as calcium fluoride, barium fluoride and strontium fluoride to provide nearly equivalent results.

In a similar manner, other alkali metal salts such as lithium salts including lithium carbonate and potassium salts including potassium carbonate and potassium hydroxide and sodium salts including sodium hydroxide and sodium phosphate can be substituted in whole or part for the sodium carbonate used as the buffer material in Examples I and II in the same amounts to provide substantially equivalent results.

Likewise, other low temperature binder and calcium ion exchange agents such as an alkali metal alginate, ammonium alginate, and a glycol alginate can be used as a substitute for all or part of the sodium alginate in Example I to provide equivalent results. As previously indicated, the preferred alginates which form a gel to act as a low temperature binder to hold the green refractory body together before firing, are sodium alginate, ammonium alginate, potassium alginate and propylene glycol alginate or other alkylene glycol alginates in which the alkylene radical has about 2 to 4 carbon atoms.

The formaldehyde used in the above described working examples may be substituted in whole or part by other non-reacting, non-foaming germicide agents such as sodium benzoate, and an alkyl ester of p-hydroxybenzoic acid in which the alkyl group has about 1 to 4 carbon atoms including methyl, propyl and butyl, although formaldehyde is highly preferred because of its deaerating action in helping to remove occluded air from the slurry. Apparently, the formaldehyde, which is preferably used in a 35 to 40% by weight solution, changes the surface tension of the slurry to permit ready air release, and vaporizes easily to displace air.

While slurries having a pH of about 7.2 to 7.8 and a viscosity of about 600 to 2000 centipoises at 25° C. are preferred, as is the case of the slurries illustrated in the working examples, other slurries made according to the present invention and having a pH of as low as about 7 to as high as about 9, and a viscosity range of as low as about 400 to 500 centipoises to as high as 3000 centipoises at 25° C. (Brookfiield) may be employed to provide at least some of the outstanding benefits of the present invention.

In a similar manner, while the green refractory articles are preferably fired for about ¼ to 3 hours using a temperature in the range of about 2900° F. to about 3250° F., particularly when the major portions of the refractory is $ZrO_2$; suitable gas impermeable refractory articles may be made using a firing temperature as low as about 2500 to 2600° F. and as high as about 3500 to 3600° F. and a firing time of about ¼ to 3 hours.

As previously indicated, excellent gas-tight articles can be made of thorium oxide, yttrium oxide and hafnium oxide. The following examples illustrate typical casting slip compositions of the above mentioned refractory oxides:

EXAMPLE III

In a manner similar to that described in Example I, strong gas-tight thin walled tubes were prepared from the following aqueous slurries:

| Ingredients | Parts by Weight | |
|---|---|---|
| | A | B |
| 99.9% $ThO_2$ calcined at 1,750° F | 100 | |
| 99.9% $ThO_2$ calcined at 3,000° F | | 100 |
| Sodium carbonate | 0.05 | .04 |
| Sodium alginate | .3 | .4 |
| Formaldehyde (40% solution) | .6 | .7 |
| Distilled water | 50 | 40 |

Strong gas-tight tubes were also prepared using the above Formulations A and B with the addition of ½ part of bentonite clay.

In the Formulations A and B, a series of gas-tight tubes were made by replacing the sodium alginate with 0.15 part and 0.4 part of ammonium alginate to provide equivalent results. The same substitutions were made with propylene glycol alginate and in each case, strong gas-tight articles were obtained. Alginic acid can also be used as all or part of the binder in place of sodium alginate, although generally the amount of sodium carbonate is doubled or tripled for the best results.

As previously indicated, the higher calcined thorium oxide can be blended with the lower calcined thorium oxide to obtain faster casting rates and, generally, the more of the higher calcined material used, the lower the mold shrinkage and the larger the size of the sintered crystals.

EXAMPLE IV

Gas-tight articles were prepared following the method described in Example I from the formulations set forth below:

| Ingredients | Parts by Weight | |
|---|---|---|
| | A | B |
| Zirconia, monoclinic | 90 | 80 |
| Yttrium oxide, calcined 1,000° F | 10 | |
| Yttrium oxide, calcined 3,000° F | | 20 |
| Sodium carbonate | .04 | 0.04 |
| Sodium alginate | .4 | |
| Ammonium alginate | | 0.1 |
| Formaldehyde | .3 | 0.8 |
| Distilled water | 40 | 35 |
| Bentonite | .5 | 0.1 |

EXAMPLE V

Strong gas-tight tubes were prepared in the manner described in Example I from the following aqueous slurries:

| Ingredients | Parts by Weight | |
|---|---|---|
| | A | B |
| 90% $HfO_2$+10% CaO (added as calcium salt that decomposes to CaO) calcined 3,130° F | 100 | |
| 98% $HfO_2$+CaO (calcined 3,400° F.) | | 100 |
| Ammonium alginate | 0.1 | 0.4 |
| Formaldehyde | 0.3 | 0.8 |
| Distilled water | 20 | 60 |
| Bentonite | 0.2 | 0.8 |

The stabilized $HfO_2$ employed in Example V may contain up to 50% CaO and a portion thereof blended with $HfO_2$ containing no CaO. Likewise, gas-tight articles can be made by substituting $Y_2O_3$ for the CaO-yielding salt or added directly to the slip. Equivalent results can also be obtained by adding to the hafnium oxide before calcination or to the slip a stabilizing oxide such as $Dy_2O_3$, MgO, BaO, SrO, $CeO_2$ and $TiO_2$.

EXAMPLE VI

A series of gas-tight tubes were prepared by extruding the following compositions:

| Ingredients | Parts by Weight | | | |
|---|---|---|---|---|
| | A | B | C | D |
| Zirconia, average particle size 5 microns | 100 | | 100 | 100 |
| Fused MgO, milled to less than 5 microns | | 100 | | |
| Polyacrylamide, 250 grade | 1 | 1 | 0.1 | 1.5 |
| Dextrine | 1 | 1 | 0.5 | 1.5 |
| Soluble wax | 1 | 1 | 0.5 | 1.5 |
| Ammonium alginate | 0.5 | 0.5 | 0.5 | 0.5 |
| 20% aqueous Dowicide G solution | 0.25 | 0.25 | 0.25 | |
| Water | 25 | 25 | 25 | 25 |

Dowicide G is a water soluble phenolic compound used generally as a fungicide and sold by the Dow Chemical Co., Midland, Michigan.

In utilizing the above formulations, the refractory oxide (see the zirconia used in Formulation A) is dry blended with the polyacrylamide, the dextrine and the soluble wax. A gel, prepared by preblending the ammonium alginate, the Dowicide G fungicide solution and about 5 parts of water was added to the dry blend and thoroughly mixed therein. The resultant mixture was extruded by suitable extruding equipment and the green extruded tubes fired to produce strong gas-tight tubes.

In Example V, the refractory ingredient can be $ThO_2$, BeO, $HfO_2$, $Sm_2O_3$, $3Al_2O_3 \cdot 2SiO_2$, $Al_2O_3$, or the zirconates, carbides, silicides and nitrides of Th, Hf, and Zr. However, in Example V and in all the examples disclosed herein, the grain size must be controlled within the limits previously specified, namely, a grain size of 1 to 90% less than 1 micron and 10 to 99% less than 40 microns and greater than 1 micron.

The above critical grain size is also important in preparing impervious, gas-tight articles from pressing compositions. The following example illustrates typical pressing compositions:

EXAMPLE VII

| Ingredients | Parts by Weight | |
|---|---|---|
| | A | B |
| $ZrO_2$+3% CaO, less than 5 microns in average particle size | 100 | |
| $ZrO_2$, 5 micron particle size | | 92 |
| $Y_2O_3$, 2 micron particle size | | 8 |
| Dextrine | 0.5 | 0.5 |
| Polyvinyl alcohol | 0.5 | 0.5 |

Gas-tight articles were prepared from the above formulations by dry mixing the ingredients, adding 6 parts by weight of water, granulating the mixtures and pressing the resultant mixtures at 5,000 p.s.i. to form green articles. The green articles were fired at 3400° F. to provide impervious, air tight structures.

What is claimed is:

1. An aqueous ceramic slurry adapted for forming a fired refractory gas-tight article, said slurry having a pH of about 7 to 9 and a specific gravity of about 1 to 3 and comprising (1) about 100 parts by weight of a relatively fine refractory material having a grain size of about 1 to 90 percent less than 1 micron and 10 to 99 percent less than 40 microns and greater than 1 micron, said refractory material consisting essentially of an oxide of an element of Group IVb of the Periodic Arrangement of the Elements and having an atomic weight of about 47 to 233, (2) about 0.01 to 3 parts weight of a low temperature binding agent which reacts with calcium ions comprising an alginate selected from the group consisting of an alkali metal alginate, ammonium alginate and an alkylene glycol alginate in which the alkylene group has from 2 to 4 carbon atoms, (3) about 0.01 to 0.35 part by weight of an alkaline buffer, and (4) about 20 to 200 parts by weight of water.

2. A ceramic slurry as defined in claim 1 in which the refractory material comprises stabilized cubic zirconium oxide in which relatively pure monoclinic zirconium oxide is heated with an oxide of the group consisting of magnesium and calcium at about 1700° F. to 3000° F. for ¼ to 2 hours to stabilize the same.

3. A method of making a strong dense, gas-tight ceramic article comprising the steps of suspending slurry-forming ingredients in water to form a slurry consisting essentially of (1) about 100 parts by weight of relatively fine refractory material having a grain size of about 1 to 90 percent less than 1 micron and 10 to 99 percent less than 40 microns and greater than 1 micron said refractory material comprising an oxide of an element of Group IV$b$ of the Periodic Arrangement of the Elements and having an atomic weight of about 47 to 233, (2) about 0.01 to 3 parts by weight of sodium alginate (3) about 0.05 to 0.35 part by weight of an alkaline buffer, and (4) about 0.05 to 2 parts by weight of a non-foaming germicide agent which is non-reactive in the mixture, and (5) about 20 to 200 parts by weight of water to form an aqueous slurry having a pH of about 7 to 9 and a specific gravity of about 1 to 3, pouring said slurry into a porous mold, absorbing the water of said slurry into said porous mold to form said slurry into a green casting of a desired shape, removing said green casting from said mold, and firing said green casting at about 2500° F. to 3600° F. to form a strong gas-tight article of desired shape.

4. A method as defined in claim 3 in which the refractory material comprises stabilized cubic zirconium oxide which is a reaction product of cubic zirconium oxide and an oxide of the group consisting of magnesium and calcium at about 1700° to 3000° F.

5. A method of making a gas-tight refractory material comprising preparing an aqueous ceramic slurry having a pH of about 7 to 9 and a specific gravity of about 1 to 3 by mixing (1) about 100 parts by weight of relatively fine refractory material having a grain size of about 1 to 90 percent less than 1 micron and 10 to 99 percent less than 40 microns and greater than 1 micron, said refractory materials consisting essentially of an oxide of an element of Group IV$b$ of the Periodic Arrangement of the Elements and having an atomic weight of about 47 to 233, (2) about 0.01 to 3 parts by weight of a low temperature binding and calcium ion-reactive agent comprising an alginate selected from the group consisting of alkali metal alginate, ammonium alginate and an alkylene gylcol alginate in which the alkylene group has from 2 to 4 carbon atoms, (3) about 0.01 to 0.35 part by weight of an alkaline buffer, and (4) about 20 to 200 parts by weight of water, forming said slurry into a green casting of a desired shape, and firing said green casting to form a strong dense gas-tight refractory article of desire shape.

6. An aqueous ceramic slurry having a pH of about 7 to 9 and a specific gravity of about 1 to 3, said slurry consisting essentially of (1) about 100 parts by weight of relatively fine particles of an oxide of a Group IV$b$ element having a grain size of about 1 to 90 percent less than 1 micron and 10 to 99 percent less than 40 microns and greater than 1 micron, (2) about 0.01 to 3 parts by weight of an alkali metal alginate, (3) about 0.01 to 0.35 part by weight of an alkaline buffer, (4) about 0.05 to 2 parts by weight of a non-foaming germicide agent that is non-recactive in the slurry, and (5) about 20 to 200 parts by weight of water.

7. An aqueous ceramic slurry having a pH of about 7 to 9 and a specific gravity of about 1 to 3, said slurry consisting essentially of (1) about 100 parts by weight of relatively fine particles of zirconium oxide having a grain size of about 1 to 90 percent less than 1 micron and 10 to 99 percent less than 40 microns and greater than 1 micron, (2) about 0.01 to 3 parts by weight of sodium alginate, (3) about 0.01 to 0.35 part by weight of an alkaline buffer, (4) about 0.05 to 2 parts by weight of a non-foaming germicide agent that is non-reactive in the slurry, and (5) about 20 to 200 parts by weight of water.

8. A method of making a gas-tight refractory article, the method comprising the steps of preparing an aqueous ceramic slurry by mixing (1) about 100 parts by weight of an oxide of an element of Group IV$b$ of the Periodic Arrangement of the Elements having an atomic weight of about 47 to 233, said oxide having a particle size of about 1 to 90 percent less than 1 micron and 10 to 90 percent less than 40 microns and greater than 1 micron, (2) about 0.01 to 3 parts by weight of an alkali metal alginate, (3) about 0.01 to 0.35 part by weight of an alkaline buffer, (4) about 0.05 to 2 parts by weight of a non-foaming germicide agent that is non-reactive in the slurry, and (5) about 20 to 200 parts by weight of water, forming said slurry into a green casting of a desired shape, firing said green casting to form a strong dense gas-tight refractory article of desired shape.

9. A method of making a gas-tight refractory article, the method comprising the steps of preparing an aqueous ceramic slurry by mixing (1) about 100 parts by weight of zirconium oxide having a particle size of about 1 to 90 percent less than 1 micron and 10 to 90 percent less than 40 microns and greater than 1 micron, (2) about 0.01 to 3 parts by weight of ammonium alginate, (3) about 0.01 to 0.35 part by weight of an alkaline buffer, (4) about 0.05 to 2 parts by weight of a non-foaming germicide agent that is non-reactive in the slurry, and (5) about 20 to 200 parts by weight of water, forming said slurry into a green casting of a desired shape, firing said green casting to form a strong dense gas-tight refractory article of desire shape.

10. A method of making a gas-tight refractory article, the method comprising the steps of preparing an aqueous ceramic slurry by mixing (1) about 100 parts by weight of zirconium oxide having a particle size of about 1 to 90 percent less than 1 micron and 10 to 90 percent less than 40 microns and greater than 1 micron, (2) about 0.01 to 3 parts by weight of propylene gylcol alginate, (3) about 0.01 to 0.35 part by weight of an alkaline buffer, (4) about 0.05 to 2 parts by weight of a non-foaming germicide agent that is non-reactive in the slurry, and (5) about 20 to 200 parts by weight of water, forming said slurry into a green casting of a desired shape, firing said green casting to form a strong dense gas-tight refractory article of desired shape.

References Cited by the Examiner
UNITED STATES PATENTS

| | | | |
|---|---|---|---|
| 2,347,225 | 4/1944 | Wainer | 106—57 |
| 2,427,034 | 9/1947 | Wainer | 106—57 |
| 2,807,857 | 10/1957 | Murray et al. | 106—55 |
| 2,910,371 | 10/1959 | Ryschkewitsch | 106—57 |

TOBIAS E. LEVOW, *Primary Examiner.*

JOHN H. MACK, *Examiner.*

J. POER, *Assistant Examiner.*